(12) United States Patent
Ericsson et al.

(10) Patent No.: US 10,809,681 B2
(45) Date of Patent: *Oct. 20, 2020

(54) DATA COLLECTION FOR ASSISTANCE IN AN INDUSTRIAL AUTOMATION ENVIRONMENT

(71) Applicant: Rockwell Automation Technologies, Inc., Mayfield Heights, OH (US)

(72) Inventors: Matthew R. Ericsson, Lyndhurst, OH (US); Ashish Anand, Mayfield Heights, OH (US); Joseph A. Harkulich, Willoughby, OH (US); Kurt A. Helfrich, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/043,044

(22) Filed: Jul. 23, 2018

(65) Prior Publication Data

US 2019/0137958 A1    May 9, 2019

Related U.S. Application Data

(63) Continuation of application No. 14/725,596, filed on May 29, 2015, now Pat. No. 10,031,495.

(51) Int. Cl.
| | | |
|---|---|---|
| *G05B 15/02* | (2006.01) | |
| *G09B 19/00* | (2006.01) | |
| *G06Q 10/10* | (2012.01) | |
| *G06Q 10/00* | (2012.01) | |
| *G06F 3/0484* | (2013.01) | |

(52) U.S. Cl.
CPC ........... *G05B 15/02* (2013.01); *G06F 3/0484* (2013.01); *G06Q 10/103* (2013.01); *G06Q 10/20* (2013.01); *G09B 19/0069* (2013.01)

(58) Field of Classification Search
CPC .... G05B 15/02; G06F 3/0484; G06Q 10/103; G06Q 10/20; G09B 19/0069
See application file for complete search history.

(56) References Cited

U.S. PATENT DOCUMENTS

| | | | | |
|---|---|---|---|---|
| 6,584,454 B1 * | 6/2003 | Hummel, Jr. | ....... | G06F 21/6218 705/1.1 |
| 7,013,701 B2 * | 3/2006 | Kawashima | ....... | G01N 27/4175 324/551 |
| 7,203,560 B1 * | 4/2007 | Wylie | ................ | G05B 23/0283 700/110 |
| 7,383,158 B2 * | 6/2008 | Krocker | ................. | G05B 15/02 700/17 |
| 7,451,606 B2 * | 11/2008 | Harrod | ................. | F24F 11/0086 62/125 |

(Continued)

*Primary Examiner* — Ronald D Hartman, Jr.

(57) ABSTRACT

Techniques to facilitate assistance to a user of an industrial application associated with an industrial automation environment are disclosed herein. In at least one implementation, a graphical user interface (GUI) associated with the industrial application is displayed on a display system of a computing system. The computing system collect contextual information comprising data associated with the industrial application. A help session is initiated with an assisting entity from within the industrial application, and the contextual information is transferred for delivery to the assisting entity.

20 Claims, 7 Drawing Sheets

(56) References Cited

U.S. PATENT DOCUMENTS

| | | | | |
|---|---|---|---|---|
| 7,792,953 B2* | 9/2010 | Cassara' | ............ | G05B 19/0423 |
| | | | | 702/188 |
| 8,121,729 B2* | 2/2012 | Blanc | .................... | B25J 9/1674 |
| | | | | 380/277 |
| 2009/0089682 A1 | 4/2009 | Baier et al. | | |
| 2014/0336795 A1* | 11/2014 | Asenjo | ............... | G05B 19/4083 |
| | | | | 700/86 |
| 2015/0100892 A1 | 4/2015 | Cronin et al. | | |

\* cited by examiner

DATA COLLECTION FOR ASSISTANCE IN AN INDUSTRIAL AUTOMATION ENVIRONMENT

RELATED APPLICATIONS

This application is a continuation of, and claims priority to, U.S. application Ser. No. 14/725,596, entitled DATA COLLECTION FOR ASSISTANCE IN AN INDUSTRIAL AUTOMATION ENVIRONMENT, filed on May 29, 2015, and granting on Jul. 24, 2018, as U.S. Pat. No. 10,031,495, and which is hereby incorporated by reference in its entirety.

TECHNICAL FIELD

Aspects of the disclosure are related to computing hardware and software technology.

TECHNICAL BACKGROUND

Software applications that run on computing systems commonly provide some type of user client interface to present information to the user and receive user inputs. In a typical client-server architecture, an application running on a client computing system receives data transmitted from a server over a communication network for display to the user on the user client interface.

Industrial automation environments utilize machines during the industrial manufacturing process. These machines typically have various moving parts and other components that continually produce operational data over time, such as pressure, temperature, speed, and other metrics. Reviewing and monitoring this operational data is of high importance to those involved in operating an industrial enterprise.

In some cases, the operational data may be provided for display on a variety of systems and devices, such as notebook or tablet computers running standalone applications, web browsers, and the like, in order to present the information to the user. For example, a tablet computer could receive a constant stream of the operational data over a network and display this information dynamically, such as by providing live tiles, icons, charts, trends, and other graphical representations which continually receive updated operational data from external data sources, which are typically located in the industrial automation environment.

Overview

Techniques to facilitate assistance to a user of an industrial application associated with an industrial automation environment are disclosed herein. In at least one implementation, a graphical user interface (GUI) associated with the industrial application is displayed on a display system of a computing system. The computing system collect contextual information comprising data associated with the industrial application. A help session is initiated with an assisting entity from within the industrial application, and the contextual information is transferred for delivery to the assisting entity.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations disclosed herein provide for expedited resolution of issues and problems in an industrial automation environment through context-enabled engagements with internal peers, customer support personnel, and other individuals. In an industrial setting, issue resolution is often time-critical and highly contextual. For example, situations can arise related to specific system capabilities, particular physical devices within a system, machine systems, and other aspects of industrial automation. The context and circumstances under which an issue develops can be highly useful in both determining a resolution and identifying similar incidents in the future. The techniques disclosed herein help to provide detailed information related to the context of problems and issues through data captured on a user's computing system.

In at least one implementation, a payload of contextual information is collected by an industrial application to share in a help session. In operation, industrial applications typically receive, process, and generate data, and this information can provide useful context when attempting to resolve an issue. The data could be collected automatically, manually, or both, and could be predetermined or identified at the time of the incident. In some implementations, data can be collected by the industrial application automatically in the background, which could occur on a predetermined schedule, periodically, in response to certain events, alarms, and other triggers, or from any other automatic programming.

The contextual information can then be shared with experts to facilitate expedited resolutions.

Figure 1:
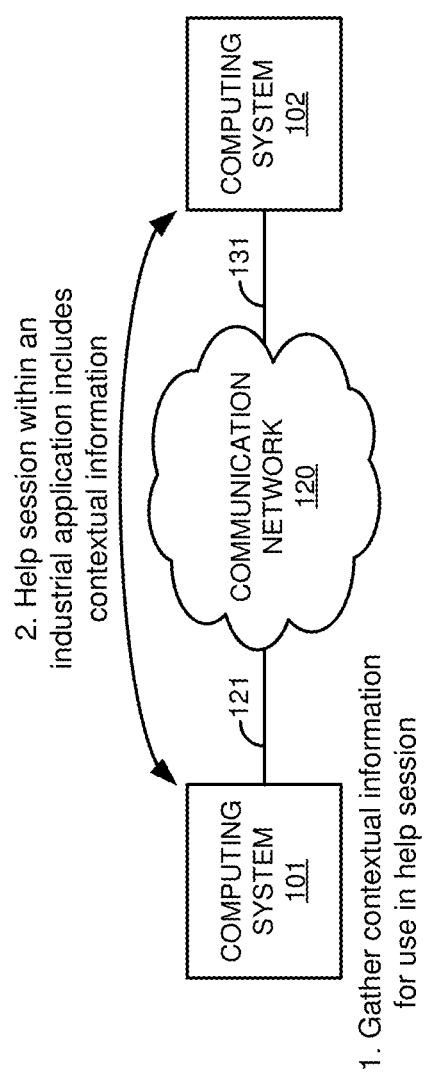
FIG. 1 is a block diagram that illustrates an operation of a communication system in an exemplary implementation.
Figure 2:
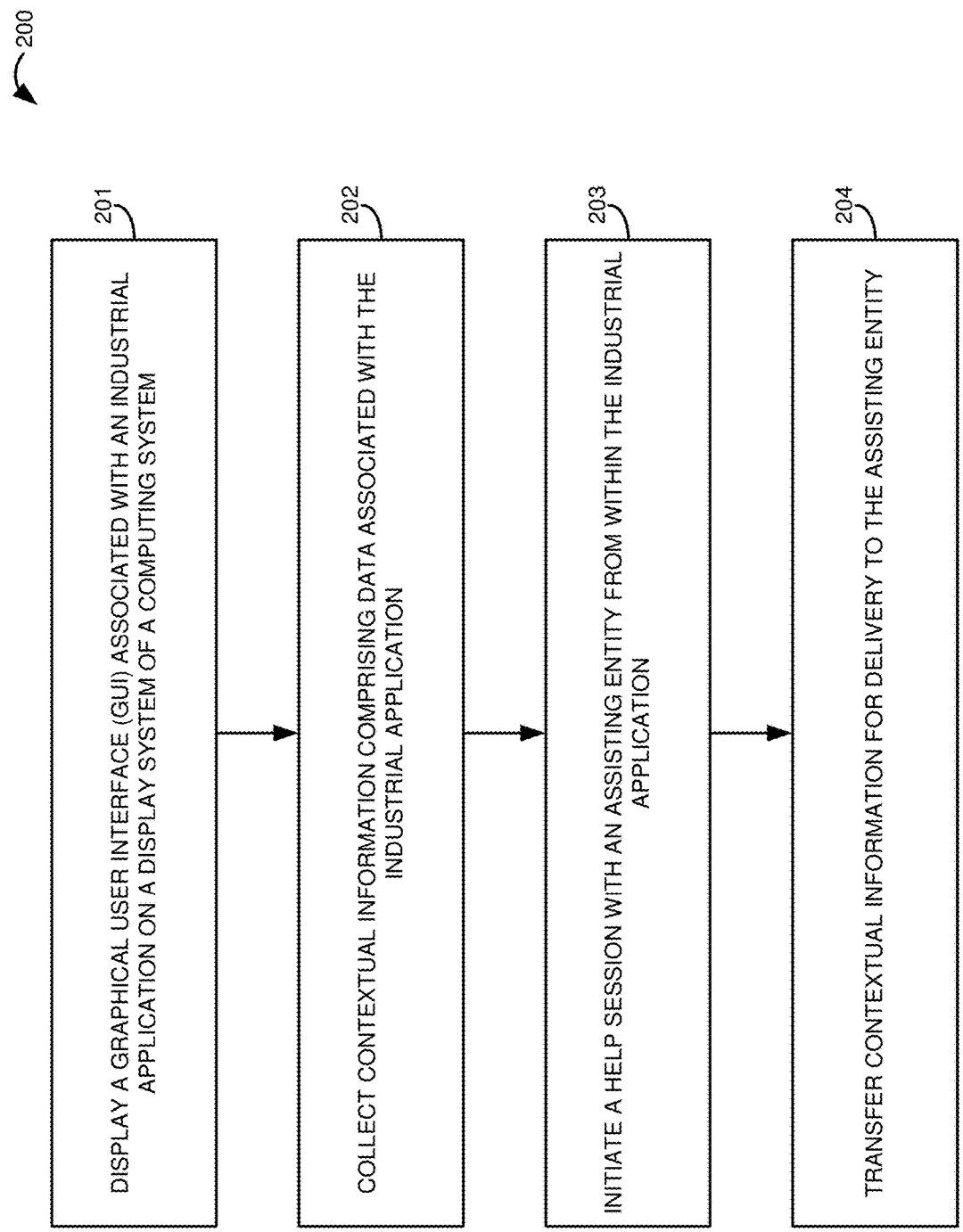
FIG. 2 is a flow diagram that illustrates an operation of a computing system in an exemplary implementation.
Figure 3:
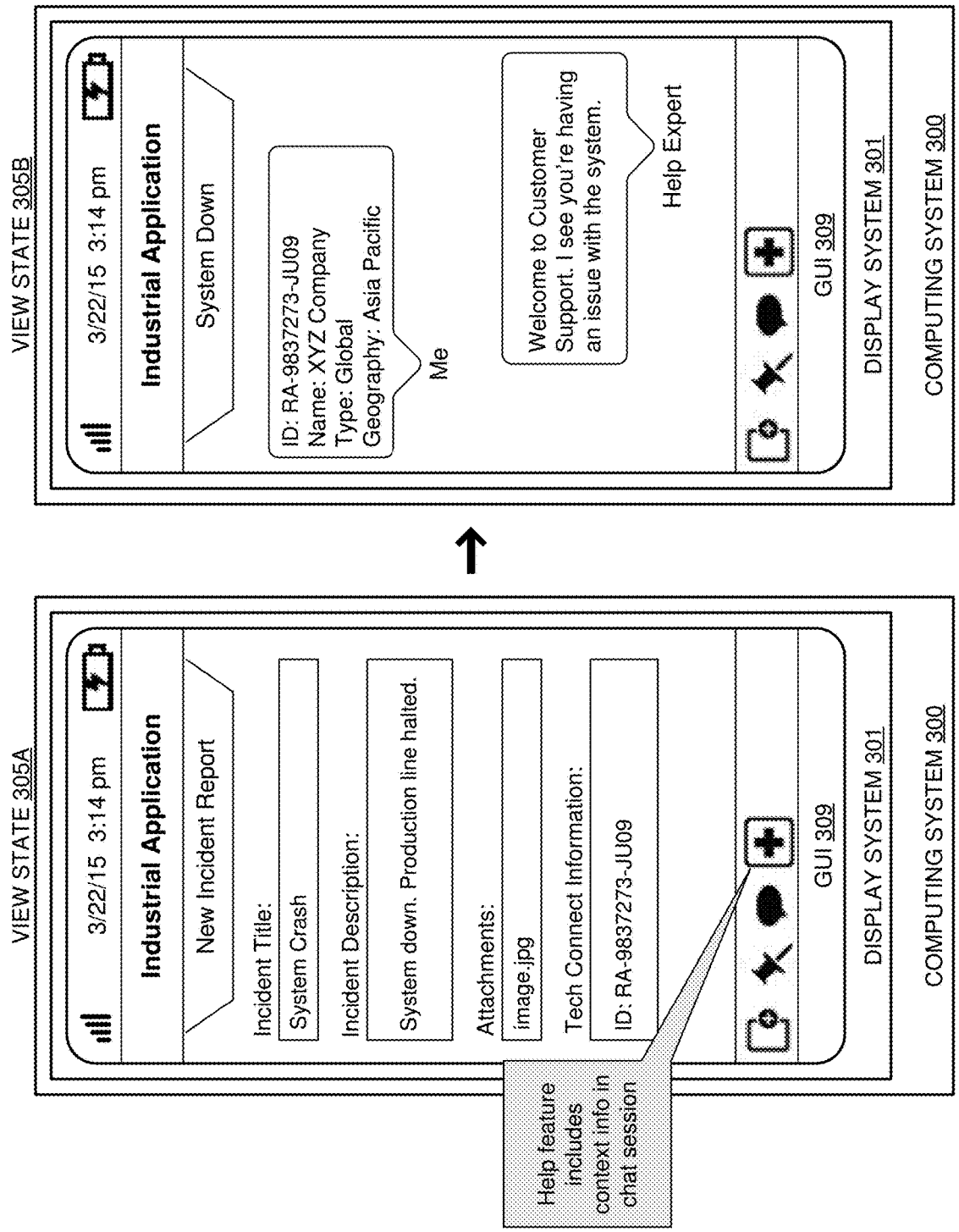
FIG. 3 is a block diagram that illustrates an operational scenario of a computing system in an exemplary implementation.
Figure 4:
FIG. 4 is a block diagram that illustrates an operational scenario of a computing system in an exemplary implementation.
Figure 5:
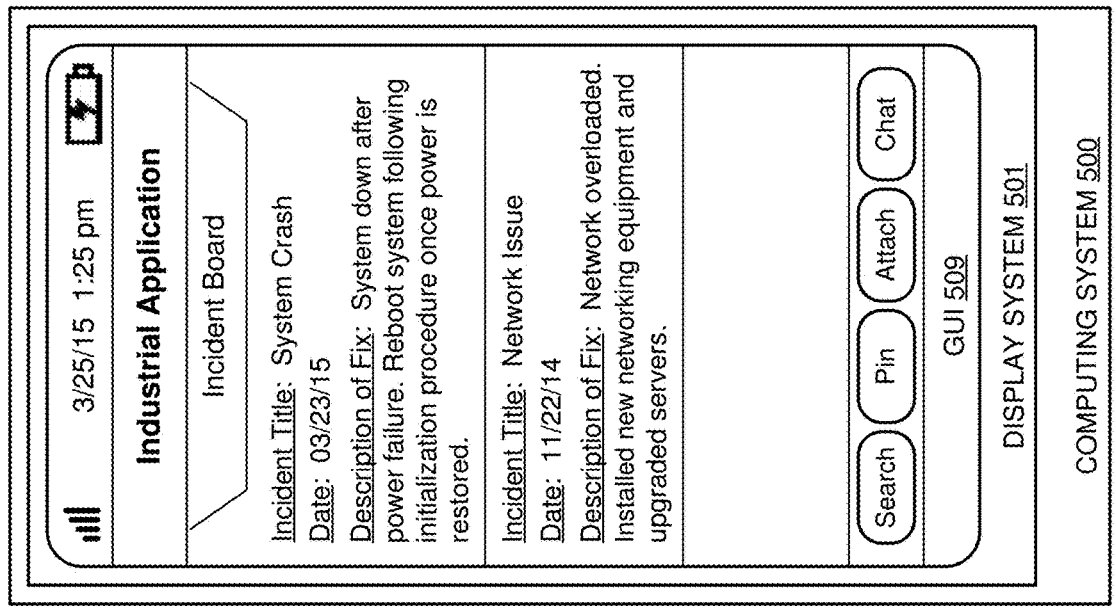
FIG. 5 is a block diagram that illustrates an operational scenario of a computing system in an exemplary implementation.
Figure 6:
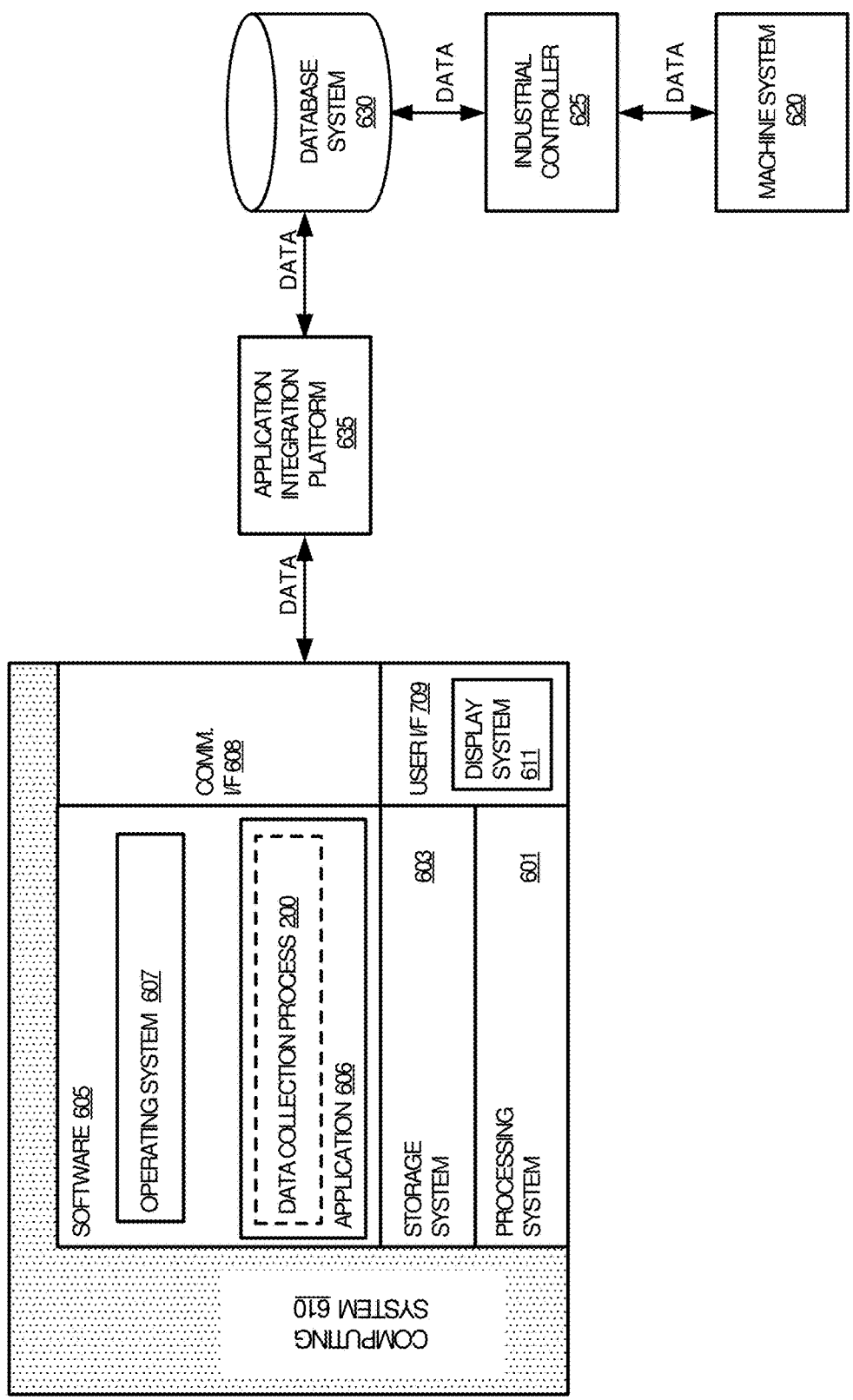
FIG. 6 is a block diagram that illustrates an operational scenario involving a computing system in an industrial automation environment in an exemplary implementation.
Figure 7:
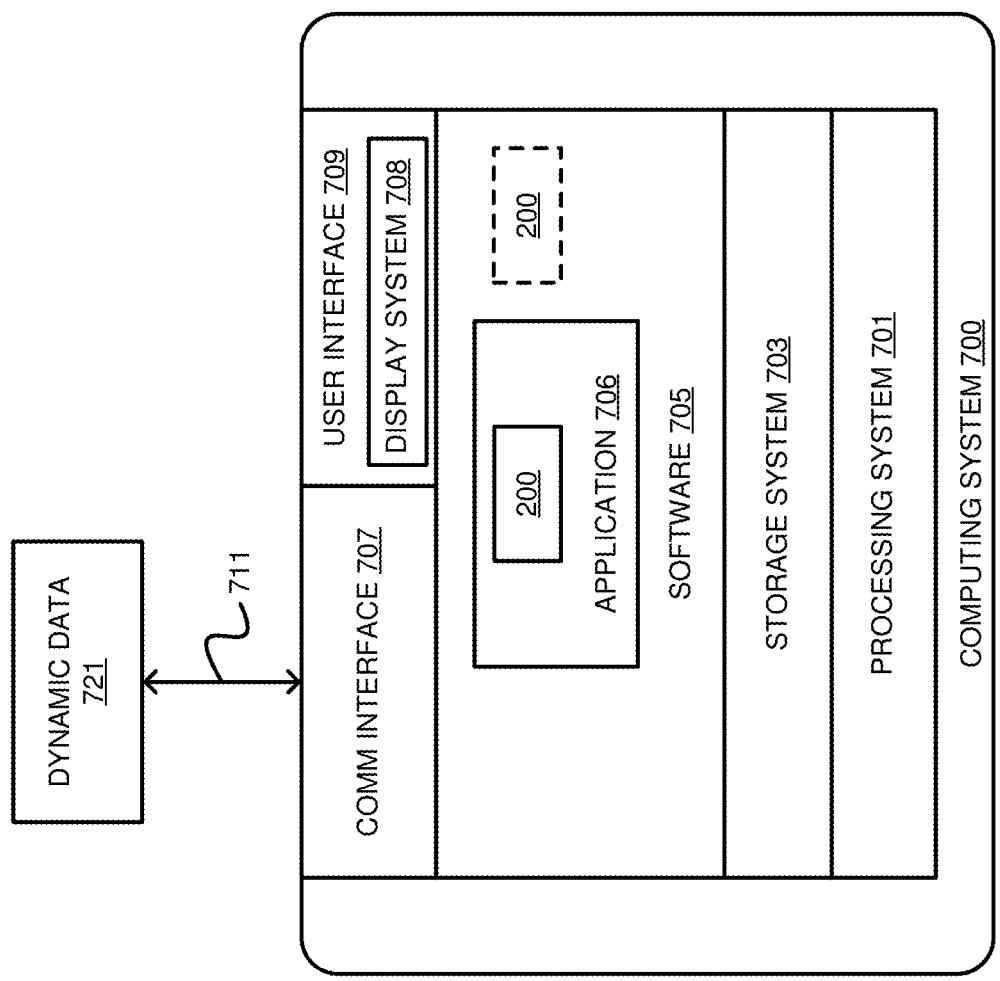
FIG. 7 is a block diagram that illustrates a computing system in an exemplary implementation.

Referring now to the drawings, FIG. 1 illustrates a communication system and an operational scenario in which a computing system provides contextual information for a help session. FIG. 2 is a flow diagram that illustrates a data collection process that may be performed by a computing system. FIG. 3 illustrates an operational scenario involving a help session launched within an incident report in an exemplary implementation, while FIG. 4 illustrates an interface to document the resolution of an incident in another exemplary implementation. FIG. 5 illustrates an operational scenario of an incident board in an exemplary implementation. FIG. 6 illustrates an exemplary industrial automation environment that includes a computing system that may be used to execute a data collection process, and FIG. 7 illustrates an exemplary computing system that may be used to perform any of the data collection processes and operational scenarios described herein.

Turning now to FIG. 1, an operational scenario of communication system 100 is illustrated in an exemplary implementation. Communication system 100 includes computing system 101, communication network 120, and computing system 102. Computing system 101 and communication network 120 communicate over communication link 121, while communication network 120 and computing system 102 are in communication over communication link 131.

An exemplary operation of communication system 100 is illustrated in FIG. 1, the order of which is designated by the numerals 1 and 2, but note that the steps could be performed in any order for any operation described herein. Initially, a user launches an industrial application on computing system 101. The user eventually encounters an issue and requests a help session. During execution, the industrial application gathers contextual information for use in the help session. The user may also select data for inclusion in the contextual information, such as screen captures, activity logs, photos, notes, videos, voice memos, and any other information the user finds helpful.

When computing system 101 engages in a help session with remote computing system 102, the contextual information is transferred to computing system 102 for use in the help session. The contextual information can then be reviewed by peers in the industrial automation environment, support personnel at a support service, or some other individual or system providing assistance to the user of computing system 101. The contextual information enables a better understanding of the issues and helps achieve a faster resolution. An exemplary operation of computing system 101 will now be described in greater detail with respect to FIG. 2.

FIG. 2 is a flow diagram that illustrates an operation 200 of a computing system in an exemplary implementation. The operation 200 shown in FIG. 2 may also be referred to as data collection process 200 herein. The steps of the operation are indicated below parenthetically. The following discussion of operation 200 will proceed with reference to computing systems 101 and 102 of FIG. 1 in order to illustrate its operations, but note that the details provided in FIG. 1 are merely exemplary and not intended to limit the scope of process 200 to the specific implementation of FIG. 1.

Operation 200 may be employed to operate a computing system to facilitate assistance to a user of an industrial application associated with an industrial automation environment. However, operation 200 could also be employed by a computing system to facilitate assistance to a user of any software application irrespective of its purpose or functionality, including a website or webpages provided by a server for viewing in a web browser, mobile applications for execution on a mobile device, editing and design tools, media players, simulation software, or any other application.

As shown in the operational flow of process 200, a graphical user interface (GUI) associated with an industrial application is displayed on a display system of computing system 101 (201). Typically, when the industrial application is launched, either by the user or an operating system or some other process, the application directs computing system 101 to display the GUI on the display system. The GUI provides the user with an interface to view and interact with graphical content and other data associated with the industrial application that is displayed by computing system 101.

Computing system 101 collects contextual information comprising data associated with the industrial application (202). The contextual information could be selected by a user in some examples, but the data could also be collected by the application automatically on a scheduled or periodic basis, or in response to alarms, incident reports, a help session request, and other events. The contextual information could comprise any data for an industrial application associated with an industrial automation environment. In some examples, the contextual information could comprise operational data, machine data, screen graphics data, operator interface screen captures, activity logs, photos, notes, voice memos, video data, tag data, alarm logs, drive configurations, human-machine interface (HMI) screenshots, key performance indicators (KPIs), charts, trends, and other graphical content, simulation data, errors, application settings, or any other data associated with an industrial application, including combinations thereof. An application server (not shown) typically collects and retrieves data for the industrial application and transfers the data to computing system 101, but note that the data could be received from various different systems which may be in geographically diverse locations. In some examples, the application server could comprise a system located on-premise and accessible over a local network connection, or running in a cloud-based environment accessed over a wide area network such as the Internet, or any other deployment scheme, including combinations thereof. In at least one implementation, the contextual information could include links to content on other systems, including cloud computing servers.

Computing system 101 initiates a help session with an assisting entity from within the industrial application (203). The assisting entity could comprise any individual or system with which a user of computing system 101 can communicate. In some examples, the assisting entity could comprise a support service, a peer within the industrial automation environment, an expert technician, or any other user or system capable of communicating with computing system 101. The help session typically comprises a text-based chat session between the users of computing systems 101 and 102, although alternative forms of communication could also be used, including voice, email, video, audio, images, and others. In at least one implementation, the help session with the assisting entity could comprise a peer-to-peer communication session. In some examples, the help session is displayed within the GUI of the industrial application. The user typically operates computing system 101 and interacts with the GUI for the industrial application in order to initiate the help session from within the industrial application, but the help session could also be initiated automatically in response to an alarm, error, incident report, or some other event. In some examples, initiating the help session could comprise transferring a request for assistance to the assisting entity, or simply establishing a data connection for transferring the contextual information.

Computing system 101 transfers the contextual information for delivery to the assisting entity (204). Advantageously, the assisting entity can then process and review the contextual information to determine how to best render assistance. For example, a problem with the user's software configuration and other user errors could easily be identified. Analysis of the contextual information can assist in routing a call to the appropriate department in a support system and helps eliminate the need for additional information gathering, thereby skipping unnecessary steps and reducing the time to a solution. As issues are resolved over time, a database of problems and their solutions can be developed and shared. An example of a graphical user interface provided by an industrial application that illustrates one possible implementation of the techniques disclosed herein will now be discussed with respect to FIG. 3.

FIG. 3 is a block diagram that illustrates an operational scenario of computing system 300 in an exemplary implementation. Computing system 300 includes display system 301 which displays graphical user interface (GUI) 309 of an industrial application. In this example, display system 301 comprises a touch screen that displays GUI 309 for the user to interact with and accepts input commands from the user via the user's touches on the surface of the touch screen. In FIG. 3, two different view states are shown displayed on display system 301, labeled 305A and 305B. The different view states show the changes that occur to GUI 309 as the user makes selections and interacts with GUI 309 and its associated application.

In view state 305A, the user has created a new incident report within the industrial application. The incident report relates to a problem or issue with industrial operations. In this case, the user has specified the title of the incident as "System Down" and has entered a description of the incident as "System crash. Production line halted." The user has also included an image attachment to the incident report, such as a screen capture of an error message. The "Tech Connect Information" section indicates an identifier associated with the user of the industrial application, which helps identify the user to a support service or some other system.

At the bottom of GUI 309 on view state 305A, the user is presented with an option to launch a help session from within the industrial application related to the incident report. Selection of the help feature also directs computing system 300 to collect contextual information for inclusion in the help session. In some implementations, the user could be prompted to include, upload, or otherwise identify various data items for inclusion in the contextual information. In this example, the help feature is provided by the small cross graphical icon appearing on GUI 309, which loads a chat session within the application. However, note that a help session could be initiated by the selection of any link, icon, button, or other trigger, or could be initiated automatically, such as in response to an alarm, error, or some other event. In this example, the user selects the help feature, which brings up a chat session as shown in view state 305B.

View state 305B illustrates an exemplary help session window that is displayed within the context of the incident report in the industrial application. In some implementations, when selecting the help option, the user may be prompted to identify a target user or users for the help session, such as a selection of the user's colleagues. However, in this example, computing system 300 automatically connects to a support service agent. As illustrated in view state 305B, the title of the incident, "System Down", is displayed at the top of the help session. In this example, the help session is also displayed within GUI 309 of the industrial application, which beneficially ensures that the context of the incident in the industrial application is not lost, and the user does not need to close the industrial application or load an additional application to receive assistance. Identifying information about the user may be included in the contextual information and displayed in the chat window as shown in view state 305B. By receiving information related to the context of the incident, the help expert is better prepared to understand the issue and arrive at a quick resolution. An exemplary implementation of an interface to document an issue and its solution will now be discussed with respect to FIG. 4.

FIG. 4 is a block diagram that illustrates an operational scenario of computing system 400 in an exemplary implementation. Computing system 400 includes display system 401 which displays GUI 409 of an industrial application. In this example, GUI 409 provides an interface for an operator to document repair steps or otherwise describe a solution to a problem. In some examples, GUI 409 could be presented to the user experiencing the problem, internal experts, customer support personnel, or any other individual. To invoke this interface, a user could select an option to document the fix, or the interface could be loaded automatically in response to an indication that an issue has been resolved, prompting the user to provide documentation.

In this example, the user has entered the incident title, indicated that the incident is resolved, and provided a description of the fix. This information can then be added to the knowledge base and may be used to help resolve similar issues in the future. In some implementations, some or all of the contextual information that was collected and used during resolution of the incident may be stored along with the documented solution. The contextual information may then be used to identify similar issues in the future that could be resolved using this solution. For example, when requesting a help session, the contextual data provided by the user could be matched to data stored along with a previously resolved issue so the solution may be pretend to the user. An exemplary implementation of an interface that provides a list of previous incidents and their solutions will now be discussed with respect to FIG. 5.

FIG. 5 is a block diagram that illustrates an operational scenario of computing system 500 in an exemplary implementation. Computing system 500 includes display system 501 which displays GUI 509 of an industrial application. In this example, an "Incident Board" is shown displayed on GUI 509, which provides a list of past incidents and the details of their resolution. The list of incidents is presented in chronological order in this example, but could be grouped by incident type, ordered based on proximity of the incidents to the user's location, or displayed in some other order in other examples. The user can access, search, and share both past issues and active issues that are still unresolved. Typically, the system stores incidents as they are reported and resolved in a database which can be used to identify similar problems as they arise in the future so that previous working solutions can be applied. Advantageously, accessing the database of previously resolved issues can decrease the time taken to understand a problem and find its solution, thereby reducing user time dealing with issues and enhancing the user experience.

Now referring back to FIG. 1, computing systems 101 and 102 each separately comprise a processing system and communication transceiver. Computing systems 101 and 102 may also include other components such as a user interface, data storage system, and power supply. Computing systems 101 and 102 may each reside in a single device or may be distributed across multiple devices. Examples of computing systems 101 and 102 include mobile computing devices, such as cell phones, tablet computers, laptop computers, notebook computers, and gaming devices, as well as any other type of mobile computing devices and any combination or variation thereof. Examples of computing systems 101 and 102 also include desktop computers, server computers, and virtual machines, as well as any other type of computing system, variation, or combination thereof. In some implementations, computing systems 101 and 102 could comprise mobile devices capable of operating in a server-like fashion which, among other uses, could be utilized in a wireless mesh network.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, asynchronous transfer mode (ATM) networks, packet networks, wireless mesh networks (WMN), local area networks (LAN), metropolitan area networks (MAN), wide area networks (WAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, peer-to-peer networking over Bluetooth, Bluetooth low energy, Wi-Fi Direct, near field communication (NFC), or some other communication format, including combinations thereof. In some examples, communication network 120 includes further access nodes and associated equipment for providing communication services to several computer systems across a large geographic region.

Communication links 121 and 131 use metal, air, space, optical fiber such as glass or plastic, or some other material as the transport medium—including combinations thereof. Communication links 121 and 131 could use various communication protocols, such as TDM, IP, Ethernet, telephony, optical networking, wireless mesh networks (WMN), communication signaling, wireless protocols such as peer-to-peer networking over Bluetooth, Bluetooth low energy, Wi-Fi Direct, near field communication (NFC), or some other communication format, including combinations thereof. Communication links 121 and 131 could be direct links or may include intermediate networks, systems, or devices.

Turning now to FIG. 6, a block diagram that illustrates an industrial automation environment 600 in an exemplary implementation is shown. Industrial automation environment 600 provides an example of an industrial automation environment that may be utilized to implement the data collection processes disclosed herein, but other environments could also be used. Industrial automation environment 600 includes computing system 610, machine system 620, industrial controller 625, database system 630, and application integration platform 635. Machine system 620 and controller 625 are in communication over a communication link, controller 625 and database system 630 communicate over a communication link, database system 630 and application integration platform 635 communicate over a communication link, and application integration platform 635 and computing system 610 are in communication over a communication link. Note that there would typically be many more machine systems in most industrial automation environments, but the number of machine systems shown in FIG. 6 has been restricted for clarity.

Industrial automation environment 600 comprises an automobile manufacturing factory, food processing plant, oil drilling operation, microprocessor fabrication facility, or some other type of industrial enterprise. Machine system 620 could comprise a sensor, drive, pump, filter, drill, motor, robot, fabrication machinery, mill, printer, or any other industrial automation equipment, including their associated control systems. A control system comprises, for example, industrial controller 625, which could include automation controllers, programmable logic controllers (PLCs), programmable automation controllers (PACs), or any other controllers used in automation control. Additionally, machine system 620 could comprise other industrial equipment, such as a brew kettle in a brewery, a reserve of coal or other resources, or any other element that may reside in an industrial automation environment 600.

Machine system 620 continually produces operational data over time. The operational data indicates the current status of machine system 620, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 620 and/or controller 625 is capable of transferring the operational data over a communication link to database system 630, application integration platform 635, and computing system 610, typically via a communication network. Database system 630 could comprise a disk, tape, integrated circuit, server, or some other memory device. Database system 630 may reside in a single device or may be distributed among multiple memory devices.

Application integration platform 635 comprises a processing system and a communication transceiver. Application integration platform 635 may also include other components such as a router, server, data storage system, and power supply. Application integration platform 635 may reside in a single device or may be distributed across multiple devices. Application integration platform 635 may be a discrete system or may be integrated within other systems—including other systems within industrial automation environment 600. In some examples, application integration platform 635 could comprise a FactoryTalk® VantagePoint server system provided by Rockwell Automation, Inc.

The communication links over which data is exchanged between machine system 620, industrial controller 625, database system 630, application integration platform 635, and communication interface 608 of computing system 610 could use metal, air, space, optical fiber such as glass or plastic, or some other material as the transport medium—including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 610 may be representative of any computing apparatus, system, or systems on which the data collection processes disclosed herein or variations thereof may be suitably implemented. Computing system 610 provides an example of a computing system that could be used as a either a server or a client device in some implementations, although such devices could have alternative configurations. Examples of computing system 610 include mobile computing devices, such as cell phones, tablet computers, laptop computers, notebook computers, and gaming devices, as well as any other type of mobile computing devices and any combination or variation thereof. Examples of computing system 610 also include desktop computers, server computers, and virtual machines, as well as any other type of computing system, variation, or combination thereof. In some implementations, computing system 610 could comprise a mobile device capable of operating in a server-like fashion which, among other uses, could be utilized in a wireless mesh network.

Computing system 610 includes processing system 601, storage system 603, software 605, communication interface 608, and user interface 609. Processing system 601 is operatively coupled with storage system 603, communication interface 608, and user interface 609. Processing system 601 loads and executes software 605 from storage system 603. Software 605 includes application 606 and operating system 607. Application 606 may include data collection process 200 in some examples. When executed by computing system 610 in general, and processing system 601 in particular, software 605 directs computing system 610 to operate as described herein for data collection process 200 or variations thereof. In this example, user interface 609 includes display system 611, which itself may be part of a touch screen that also accepts user inputs via touches on its surface. Computing system 610 may optionally include additional devices, features, or functionality not discussed here for purposes of brevity.

Turning now to FIG. 7, a block diagram is shown that illustrates computing system 700 in an exemplary implementation. Computing system 700 provides an example of computing systems 101, 300, 400, 500, or any computing system that may be used to execute data collection process 200 or variations thereof, although such systems could use alternative configurations. Computing system 700 includes processing system 701, storage system 703, software 705, communication interface 707, and user interface 709. User interface 709 comprises display system 708. Software 705 includes application 706 which itself includes data collection process 200. Data collection process 200 may optionally be implemented separately from application 706.

Computing system 700 may be representative of any computing apparatus, system, or systems on which application 706 and data collection process 200 or variations thereof may be suitably implemented. Examples of computing system 700 include mobile computing devices, such as cell phones, tablet computers, laptop computers, notebook computers, and gaming devices, as well as any other type of mobile computing devices and any combination or variation thereof. Note that the features and functionality of computing system 700 may apply as well to desktop computers, server computers, and virtual machines, as well as any other type of computing system, variation, or combination thereof.

Computing system 700 includes processing system 701, storage system 703, software 705, communication interface 707, and user interface 709. Processing system 701 is operatively coupled with storage system 703, communication interface 707, and user interface 709. Processing system 701 loads and executes software 705 from storage system 703. When executed by computing system 700 in general, and processing system 701 in particular, software 705 directs computing system 700 to operate as described herein for data collection process 200 or variations thereof. Computing system 700 may optionally include additional devices, features, or functionality not discussed herein for purposes of brevity.

Referring still to FIG. 7, processing system 701 may comprise a microprocessor and other circuitry that retrieves and executes software 705 from storage system 703. Processing system 701 may be implemented within a single processing device but may also be distributed across multiple processing devices or sub-systems that cooperate in executing program instructions. Examples of processing system 701 include general purpose central processing units, application specific processors, and logic devices, as well as any other type of processing device, combinations, or variations thereof.

Storage system 703 may comprise any computer readable media or storage media readable by processing system 701 and capable of storing software 705. Storage system 703 may include volatile and nonvolatile, removable and non-removable media implemented in any method or technology for storage of information, such as computer readable instructions, data structures, program modules, or other data. Storage system 703 may be implemented as a single storage device but may also be implemented across multiple storage devices or sub-systems co-located or distributed relative to each other. Storage system 703 may comprise additional elements, such as a controller, capable of communicating with processing system 701. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 709, processing system 701 loads and executes portions of software 705, such as data collection process 200, to render a graphical user interface for application 706 for display by display system 708 of user interface 709. Software 705 may be implemented in program instructions and among other functions may, when executed by computing system 700 in general or processing system 701 in particular, direct computing system 700 or processing system 701 to display a graphical user interface (GUI) associated with an industrial application on display system 708 of computing system 700. Software 705 may further direct computing system 700 or processing system 701 to collect contextual information comprising data associated with the industrial application. In addition, software 705 directs computing system 700 or processing system 701 to initiate a help session with an assisting entity from within the industrial application. Finally, software 705 may direct computing system 700 or processing system 701 to transfer the contextual information for delivery to the assisting entity.

Software 705 may include additional processes, programs, or components, such as operating system software or other application software. Examples of operating systems include Windows®, iOS®, and Android®, as well as any other suitable operating system. Software 705 may also comprise firmware or some other form of machine-readable processing instructions executable by processing system 701.

In general, software 705 may, when loaded into processing system 701 and executed, transform computing system 700 overall from a general-purpose computing system into a special-purpose computing system customized to facilitate assistance to a user of an industrial application as described herein for each implementation. For example, encoding software 705 on storage system 703 may transform the physical structure of storage system 703. The specific transformation of the physical structure may depend on various factors in different implementations of this description. Examples of such factors may include, but are not limited to the technology used to implement the storage media of storage system 703 and whether the computer-storage media are characterized as primary or secondary storage.

In some examples, if the computer-storage media are implemented as semiconductor-based memory, software 705 may transform the physical state of the semiconductor memory when the program is encoded therein. For example, software 705 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 700 is generally intended to represent a computing system with which software 705 is deployed and executed in order to implement application 706 and/or data collection process 200 (and variations thereof). However, computing system 700 may also represent any computing system on which software 705 may be staged and from where software 705 may be distributed, transported, downloaded, or otherwise provided to yet another computing system for deployment and execution, or yet additional distribution. For example, computing system 700 could be configured to deploy software 705 over the internet to one or more client computing systems for execution thereon, such as in a cloud-based deployment scenario.

Communication interface 707 may include communication connections and devices that allow for communication between computing system 700 and other computing systems (not shown) or services, over a communication network 711 or collection of networks. In some implementations, communication interface 707 receives dynamic data 721 over communication network 711. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 709 may include a voice input device, a touch input device for receiving a gesture from a user, a motion input device for detecting non-touch gestures and other motions by a user, and other comparable input devices and associated processing elements capable of receiving user input from a user. Output devices such as display system 708, speakers, haptic devices, and other types of output devices may also be included in user interface 709. The aforementioned user input devices are well known in the art and need not be discussed at length here. User interface 709 may also include associated user interface software executable by processing system 701 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A non-transitory computer-readable medium having stored thereon instructions that, in response to execution, cause a system comprising a processor to perform operations, the operations comprising:
    enabling display of a graphical user interface (GUI) associated with the industrial application on a display system of the computing system;
    collecting contextual information comprising data associated with the industrial application and an operator interface screen capture associated with the industrial application;
    initiating a help session with an assisting entity from within the industrial application; and
    transferring the contextual information for delivery to the assisting entity.

2. The non-transitory computer-readable medium of claim 1 wherein the assisting entity comprises a support service.

3. The non-transitory computer-readable medium of claim 1 wherein the assisting entity comprises a peer within the industrial automation environment.

4. The non-transitory computer-readable medium of claim 1 wherein the help session is displayed within the GUI of the industrial application.

5. The non-transitory computer-readable medium of claim 1 wherein the help session with the assisting entity comprises a peer-to-peer communication session.

6. The non-transitory computer-readable medium of claim 1 wherein the industrial application collects the contextual information based on at least one of the following: a predetermined schedule, periodically, and in response to an event.

7. The non-transitory computer-readable medium of claim 1 wherein the contextual information comprises at least one activity log associated with the industrial application.

8. A method of operating a computing system to facilitate assistance within an industrial application associated with an industrial automation environment, the method comprising:
   enabling display, by a system comprising a processor, of a graphical user interface (GUI) associated with the industrial application on a display system of the computing system;
   collecting, by the system, contextual information comprising data associated with the industrial application and an operator interface screen capture associated with the industrial application;
   initiating, by the system, a help session with an assisting entity from within the industrial application; and
   transferring, by the system, the contextual information for delivery to the assisting entity.

9. The method of claim 8 wherein the assisting entity comprises a support service.

10. The method of claim 8 wherein the assisting entity comprises a peer within the industrial automation environment.

11. The method of claim 8 wherein the help session is displayed within the GUI of the industrial application.

12. The method of claim 8 wherein the help session with the assisting entity comprises a peer-to-peer communication session.

13. The method of claim 8 wherein the industrial application collects the contextual information based on at least one of the following: a predetermined schedule, periodically, and in response to an event.

14. The method of claim 8 wherein the contextual information comprises at least one activity log associated with the industrial application.

15. An apparatus for facilitating assistance within an industrial application associated with an industrial automation environment, the apparatus comprising:
   a memory that stores executable components; and
   a processor, operatively coupled to the memory, that executes the executable components, the executable components comprising:
   enabling display of a graphical user interface (GUI) associated with the industrial application on a display system of the computing system;
   collecting contextual information comprising data associated with the industrial application and an operator interface screen capture associated with the industrial application;
   initiating a help session with an assisting entity from within the industrial application; and
   transferring the contextual information for delivery to the assisting entity.

16. The apparatus of claim 15 wherein the assisting entity comprises a support service.

17. The apparatus of claim 15 wherein the assisting entity comprises a peer within the industrial automation environment.

18. The apparatus of claim 15 wherein the help session is displayed within the GUI of the industrial application.

19. The apparatus of claim 15 wherein the help session with the assisting entity comprises a peer-to-peer communication session.

20. The apparatus of claim 15 wherein the industrial application collects the contextual information based on at least one of the following: a predetermined schedule, periodically, and in response to an event.

* * * * *